(12) United States Patent
Kraushaar

(10) Patent No.: US 9,376,146 B2
(45) Date of Patent: Jun. 28, 2016

(54) REINFORCED STRUCTURE OF A MOTOR VEHICLE

(71) Applicant: SIKA TECHNOLOGY AG, Baar (CH)

(72) Inventor: Thomas Kraushaar, Zurich (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 13/955,714

(22) Filed: Jul. 31, 2013

(65) Prior Publication Data

US 2013/0316101 A1 Nov. 28, 2013

Related U.S. Application Data

(63) Continuation of application No. 13/050,458, filed on Mar. 17, 2011, now Pat. No. 8,511,743, which is a continuation of application No. PCT/EP2009/062083, filed on Sep. 18, 2009.

(30) Foreign Application Priority Data

Sep. 19, 2008 (EP) ..................................... 08164690

(51) Int. Cl.
*B62D 27/00* (2006.01)
*B62D 27/02* (2006.01)
(Continued)

(52) U.S. Cl.
CPC .............. *B62D 27/023* (2013.01); *B62D 21/15* (2013.01); *B62D 29/002* (2013.01); *Y10T 29/49616* (2015.01); *Y10T 428/13* (2015.01); *Y10T 428/23* (2015.01); *Y10T 428/249953* (2015.04)

(58) Field of Classification Search
CPC ..... B62D 21/15; B62D 29/002; B62D 27/023

USPC .......................................... 296/187.2, 187.02
See application file for complete search history.

(56) References Cited

U.S. PATENT DOCUMENTS

| 4,105,236 A | 8/1978 | Haar |
| 4,888,124 A | 12/1989 | Blum et al. |

(Continued)

FOREIGN PATENT DOCUMENTS

| DE | 199 34 666 A1 | 1/2001 |
| EP | 0 204 970 A2 | 12/1986 |

(Continued)

OTHER PUBLICATIONS

International Search Report (PCT/ISA/210) issued on Dec. 1, 2009, by European Patent Office as the International Searching Authority for International Application No. PCT/EP2009/062083.

(Continued)

*Primary Examiner* — Dennis H Pedder
(74) *Attorney, Agent, or Firm* — Buchanan Ingersoll & Rooney PC

(57) ABSTRACT

A reinforced structure is disclosed which includes a structural component as well as a reinforcing part that is arranged in a cavity of the structural component. The reinforcing part can include a support part and a connection, the support part being arranged in the cavity such that a distance between the support part and the structural component at a position of the structural component with a higher probability of deforming under a force load from outside on the structural component is shorter than at a position of the structural component with a lower probability of deforming under a force load from the outside.

7 Claims, 4 Drawing Sheets

(51) Int. Cl.
    *B62D 21/15*     (2006.01)
    *B62D 29/00*     (2006.01)

(56) References Cited

U.S. PATENT DOCUMENTS

| | | | |
|---|---|---|---|
| 5,170,898 A * | 12/1992 | Katz et al. | 211/193 |
| 5,266,133 A | 11/1993 | Hanley et al. | |
| 5,373,027 A | 12/1994 | Hanley et al. | |
| 5,678,826 A | 10/1997 | Miller | |
| 6,003,274 A * | 12/1999 | Wycech | 52/232 |
| 6,135,542 A | 10/2000 | Emmelmann et al. | |
| 6,168,226 B1 * | 1/2001 | Wycech | 296/146.6 |
| 6,199,940 B1 | 3/2001 | Hopton et al. | |
| 6,247,287 B1 | 6/2001 | Takabatake | |
| 6,276,105 B1 * | 8/2001 | Wycech | 52/309.8 |
| 6,378,933 B1 | 4/2002 | Schoen et al. | |
| 6,387,470 B1 | 5/2002 | Chang et al. | |
| 6,668,457 B1 | 12/2003 | Czaplicki | |
| 6,854,767 B2 * | 2/2005 | Yakata et al. | 280/808 |
| 7,364,221 B2 * | 4/2008 | Tahri et al. | 296/187.02 |
| 8,511,743 B2 | 8/2013 | Kraushaar | |
| 2003/0227182 A1 * | 12/2003 | Yoshida et al. | 293/102 |
| 2004/0084141 A1 | 5/2004 | Czaplicki | |
| 2004/0130185 A1 | 7/2004 | Hasler et al. | |
| 2004/0256888 A1 | 12/2004 | Le Gall et al. | |
| 2006/0152041 A1 | 7/2006 | Igarashi et al. | |
| 2007/0105983 A1 * | 5/2007 | Kramer et al. | 523/455 |
| 2009/0085379 A1 | 4/2009 | Takahashi et al. | |

FOREIGN PATENT DOCUMENTS

| | | |
|---|---|---|
| JP | 11-099960 A | 4/1999 |
| JP | 11-129368 A | 5/1999 |
| JP | 2002-173049 A | 6/2002 |
| JP | 2004-314674 A | 11/2004 |
| JP | 2007-503324 A | 2/2007 |
| JP | 2007-191008 A | 8/2007 |
| JP | 2008-161896 A | 7/2008 |
| JP | 2012502841 A | 2/2012 |
| WO | WO 01/41950 A2 | 6/2001 |
| WO | 2005019310 A2 | 3/2005 |
| WO | WO 2005/080524 A1 | 9/2005 |

OTHER PUBLICATIONS

Written Opinion of the International Searching Authority (form PCT/ISA/237) in International Application No. PCT/EP2009/062083, dated Dec. 1, 2009, and an English translation thereof.

S. Glaser, "Structural Plastic Inserts in the Car Body", Innovation Plastics, ATZproduktion, Jan. 2008 (as indicated in the Opposition by L&L Products attached to the Notice of opposition to a European patent filed in connection with European Patent No. EP2337728, dated Jun. 12, 2014).

"L & L Products Europe, Engineered Solutions for the Worldwide Automotive Industry, Acoustic, Sealing, Anti-flutter & Structural Material", pp. 1-16, Jun. 2007 (as indicated in the Opposition by L&L Products attached to the Notice of opposition to a European patent filed in connection with European Patent No. EP2337728, dated Jun. 12, 2014).

P. Mohan et al., "Innovative Approach for Improving Roof Crush Resistance", 5. LS-DYNA Anwenderforum, Material I-Validierung, DYNAmore GmbH, D-I-1 to D-I-10, Ulm 2006.

Notice of opposition to a European patent filed in connection with corresponding European Patent No. EP2337728 (Application No. EP09814121.1), dated Jun. 12, 2014, and attached Opposition by L&L Products (21 pages).

Japanese Office Action dated Aug. 18, 2015, issued in Japanese Patent Application No. 2014-156769, with English translation (10 pages).

Korean Office Action issued Jun. 16, 2015 in corresponding Korean patent application No. 10-2011-7008132 with partial translation.

Japanese Office Action issued Sep. 10, 2013 in corresponding Japanese patent application No. 2011-527329 with translation.

\* cited by examiner

REINFORCED STRUCTURE OF A MOTOR VEHICLE

RELATED APPLICATIONS

This application is a continuation of U.S. patent application Ser. No. 13/050,458, filed Mar. 17, 2011, which claims priority as a continuation application under 35 U.S.C. §120 to PCT/EP2009/062083, which was filed as an International Application on Sep. 18, 2009 designating the U.S., and which claims priority to European Application 08164690.3 filed in Europe on Sep. 19, 2008. The entire contents of these applications are hereby incorporated by reference in their entireties.

FIELD

The disclosure relates to a reinforced structure having a structural component, a reinforcing part arranged in a cavity of the structural component with a support part, and a connection between the structural component and the support part.

BACKGROUND INFORMATION

In construction of, for example, structures for transport means, structural components in cavity form are used. This type of construction makes it possible to keep a weight of the construction and the material expense low. This can result in, however, a reduction in stability of the component, which can affect stability in traffic accidents for structures for transport means.

To counteract the reduction of stability and at the same time to enable the use of cavities, reinforcing parts have been used in such cavities. Such reinforcing parts can include support parts, such as those formed of rigid materials, as well as connections that tightly anchor the reinforcing part in the cavity.

Known reinforced structural components, also referred to herein as reinforced structures, are reinforced uniformly against stresses from the outside, and have a uniform amount of connections between a support part and the structural component. Both can result in a high material cost and weight of the reinforcing part and thus the reinforced structure.

An uneven distribution of the connections between the support part and the structural component for increasing bending strength of automobile bodies is disclosed in U.S. Pat. No. 6,378,933 B1. The support part is a hollow body that is surrounded by a reinforcing foam mass. The shape of the hollow body is configured in such a way that areas of the structural components with high bending stress have as large a proportion of the reinforcing foam mass as possible. In comparison to materials of support parts with elasticity moduli of 5,000-200,000 MPa, an elasticity modulus of reinforcing foam masses with 400-2,000 MPa is significantly smaller and thus has a lower stabilizing effect in the case of a traffic accident.

SUMMARY

A reinforced structure is disclosed comprising: a structural component; a reinforcing part that is arranged in a cavity of the structural component, the reinforcing part including a support part; and a connection means, arranged between the structural component and the support part, wherein the support part is arranged in the cavity such that a distance between the support part and the structural component at positions of the structural component with a higher probability of deforming under a force load from outside on the structural component is shorter than at positions of the structural component with a lower probability of deforming under a force load from the outside, and wherein a portion of the connection means allocated at a position of the structural component with a highest probability of deforming is 0-60% of a portion of the connection means allocated at a position of the structural component with a lowest probability of deforming.

A reinforcing part for reinforcing a cavity of a structural component is disclosed, comprising: a support part; and a connection means for activation and for application to an outside of the support part, wherein the support part is molded such that after activation of the connection means, a distance between the support part and the structural component at positions of the structural component with a higher probability of deforming under a force load from the outside on the structural component is shorter than at positions of the structural component with a lower probability of deforming under a force load from the outside, wherein a portion of the connection means allocated at a position of the structural component with a highest probability of deforming is 0-60% of a portion of the connection means allocated at a position of the structural component with a lowest probability of deforming.

A method for reinforcing a structural component is disclosed with at least one reinforcing part, having a support part and a connection means that can be activated and that is arranged between the structural component and the support part, in a cavity of the structural component, comprising: i) setting up an FE model of the structural component independently of the at least one reinforcing part being arranged in the cavity; or i') setting up an FE model of the structural component with the at least one reinforcing part arranged in the cavity; ii) calculating a crash behavior of the FE model; iii) using a lesser of activatable connection means at positions with high deformation compared to positions with low deformation of the structural component in the calculated crash behavior of the FE model; iv) producing a reinforcing part, which has a distribution of the connection means based on the lesser amount; v) placing the reinforcing part in the cavity of the structural component for activation of the connection means therein.

BRIEF DESCRIPTION OF THE DRAWING

Embodiments of the disclosure based on the drawings will be explained in more detail with reference to the figures. The same elements are provided with the same reference number in the various figures, wherein.

Figure 1:
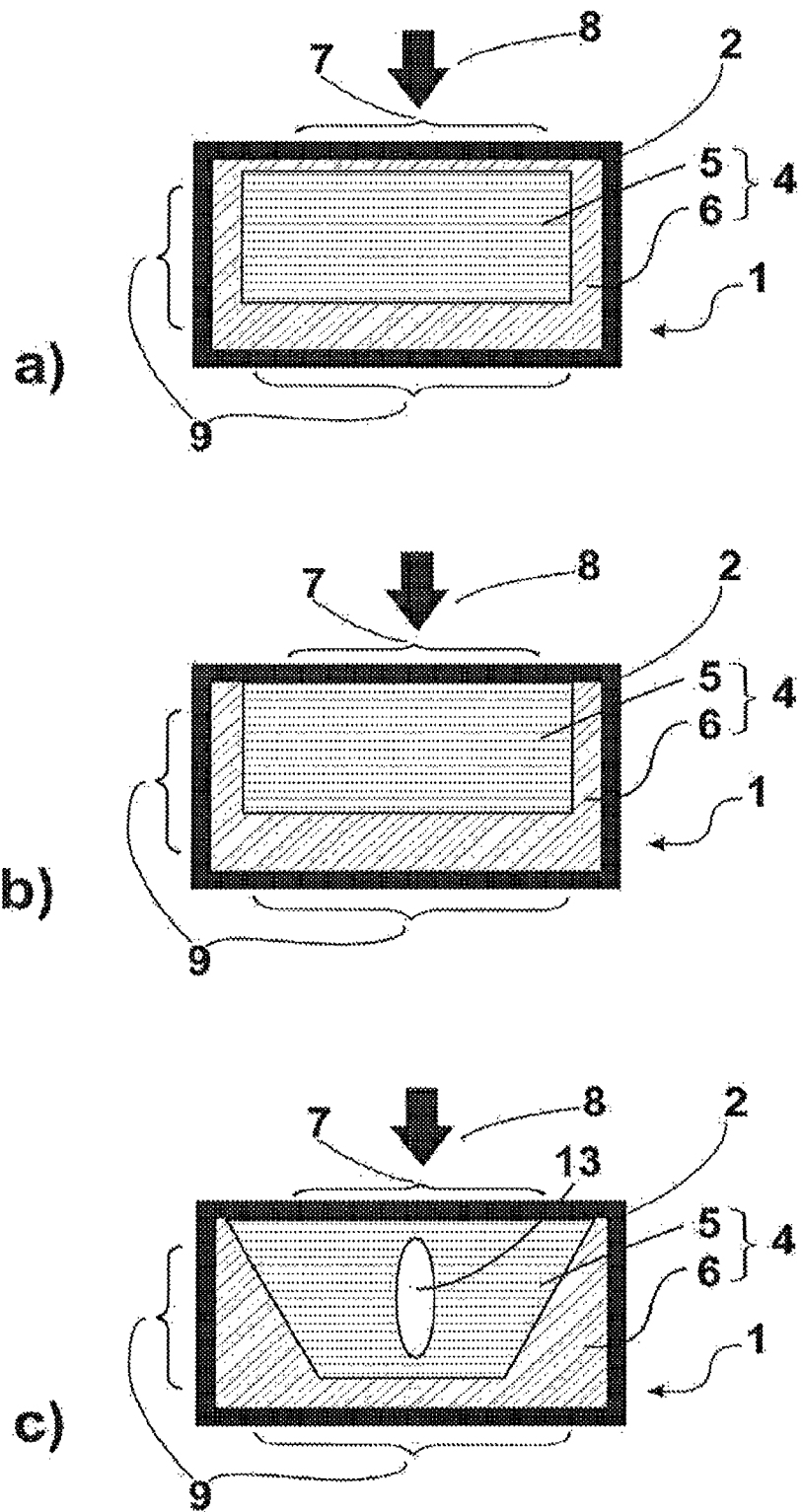
FIGS. 1a-1c show diagrammatic cross-sections through exemplary structures that are reinforced according to the disclosure, with an exemplary reinforcing part according to the disclosure in a cavity of a structural component after activation of a connection.

Only elements essential for understanding exemplary embodiments of the disclosure are shown.

DETAILED DESCRIPTION

The present disclosure presents exemplary embodiments for reducing weight in a reinforced structure, and at the same time, ensuring specified stability.

In exemplary embodiments, a support part can be arranged in the cavity in such a way that the distance between the support part and the structural component at positions of the structural component with a higher probability of deforming under a force load from the outside on the structural component is shorter than at the positions of the structural component with a lower probability of deforming under a force load from the outside.

In structural examples, an amount (e.g., percentage size and/or number) of the connection means at positions of the structural component with a higher probability of deforming under a force load from the outside on the structural component is less than (e.g., smaller than) at the positions of the structural component with a lower probability of deforming under a force load from the outside. The connection means, for example when it is a foamed material, can have a lower reinforcing property relative to the stability of the structural component than the support part. A smaller, or lesser, amount of connection means at the above-mentioned position(s) thus can allow a closer positioning of the support part, which can have a higher reinforcing property, at the structural component at the above-mentioned position. In the case of stress, the structural component thus keeps its original shape, for example, its original cross-section, if anything, which can affect on the stability of the structural component.

With a construction according to exemplary embodiments of the disclosure, the reinforced structure in comparison to known types of construction can be more stable relative to force load from the outside and thus can be produced with less material for the reinforcing part and thus with less weight, to ensure a desired stability.

FIGS. 1*a*-1*c* and 2*a*-2*d* each show an exemplary structure 1 that is reinforced according to the disclosure and that comprises a structural component 2 as well as a reinforcing part 4 that is arranged in the cavity 3 of the structural component, whereby this reinforcing part 4 comprises a support part 5 and a connection means 6 that is arranged between the structural component 2 and the support part 5. Such a reinforced structure 1 comprises a support part 5, which is arranged in the cavity 3 in such a way that the distance between the support part and the structural component 2 at the positions of the structural component with a higher probability of deforming 7 under a force load 8 from the outside on the structural component is shorter than at the positions of the structural component with a lower probability of deforming 9 under a force load 8 from the outside.

Structural components can be reinforced at sites where a special stress on the structural component can be expected. Such stresses or load types that are to be expected are often known as standardized load types and allow one skilled in the art to examine the behavior, such as the deforming behavior, of structural components in the case of a force load from the outside on the structural component. Such standardized load types can be of great importance in, for example, the motor vehicle industry. They allow the behavior of reinforced structures to be analyzed in typical cases of stress, such as in motor vehicle accidents, based on the standardized load types. The motor vehicle industry knows a number of such standardized load types, such as frontal collision, impact against obstacles, crash-barrier impact, vehicle-vehicle impact, side impact or rear impact. Standardized load types contain, among other features, crash-test programs such as the European New Car Assessment Program (Euro NCAP) or the US New Car Assessment Program (US NCAP).

The force load 8 from the outside corresponds to a standardized load type, such as a standardized load type from the motor vehicle industry, as previously mentioned.

If a structural component 2 is deformed because of a force load 8 from the outside, the stability of the structural component can be reduced.

The capability of withstanding compressive forces, such as the capability of withstanding deforming under a force load from the outside can, for example, be of importance when the shape of the structural component, such as the cross-section, is configured in such a way that the structural component makes a contribution to the stability of the transport means. If the structural component 2 is, for example, a B-support of a motor vehicle, the structural component can lose stability in the case of a deformation, for example when the deformation acts on the cross-section, for example in the case of a buckling, based on a force load 8 from the outside. This can have the result that the stability of the motor vehicle also decreases.

The probability of deforming can be determined empirically and/or theoretically, for example by using an FE model of the structural component 2, whereby the probability of deforming is defined as the probability of deforming of a structural component 2 independently (e.g., without considering a support part 5 arranged in the cavity 3, as in a case before the support plate 5 is arranged in the cavity). The probability of deforming can be determined, on the one hand, empirically, for example in actual stress tests. Such tests can involve, however, the construction of a prototype and can thus be associated with a large amount of time and high costs. It can therefore be advantageous if the number of actual stress tests can be reduced to a few tests with finished, developed components. On the other hand, the probability of deforming can be determined theoretically, such as by using a finite-element model (FE model), for example an FE model of a structural component 2. Such determinations can be performed, using among other features computers, and can be faster and less expensive than the actual stress tests and can be especially suitable during the development of components.

In motor vehicle construction, software programs are employed that use the FE models for simulating load types, such as motor vehicle accidents, such as, for example, PAM-Crash of the ESI group, France, or LS Dyne® of the Livermore Software Technology Corporation, USA.

According to the disclosure, the support part 5 is arranged in the cavity 3 in such a way that the distance between the support part and the structural component 2 at positions of the structural component with a higher probability of deforming 7 under a force load 8 from the outside on the structural component 2 is shorter than at the positions of the structural component with a lower probability of deforming 9 under a force load from the outside. With increasing proximity of the support part, the probability of deforming of the structural component 2 declines, and thus the stability of the structural component increases.

In exemplary embodiments, at the position of the structural component 2 with the highest probability of deforming, the amount of the connection means can be 0-60% (for example, 10-30%) of the amount of the connection means at the position of the structural component 2 with the lowest probability of deforming under a force load from the outside.

The distance between the support part 5 and the structural component 2 at the position of the structural component with the highest probability of deforming under a force load 8 from the outside is, for example, 20-0 mm, in particular 10-0 mm, and preferably, for example, 5 to 0 mm.

In exemplary embodiments, the amount of the connection means 6 between the structural component 2 and the support part 5 at positions of the structural component 2 with a higher probability of deforming 7 under a force load 8 from the outside on the structural component can be smaller (i.e., lesser) than at the positions of the structural component 2 with a lower probability of deforming 9 under a force load from the outside. This is shown in, for example, FIGS. 1a, 2a, 2b and 2d. It may be advantageous, for example, when even no connection means is present at positions of the structural component 2 with a higher probability of deforming 7 as is shown in, for example, FIGS. 1b, 1c and 2c.

In its activated state, the connection means 6, such as when this is a foamed material, can have a lower reinforcing property than the support part 5. A smaller amount of the connection means 6 at the above-mentioned position thus allows a closer positioning of the support part, which can have a higher reinforcing property on the structural component at the above-mentioned position. In the case of stress, the structural component 2 can be thus more likely to maintain its shape, such as its cross-section, which can have an advantageous effect on the stability of the structural component.

The structural component 2 can include (e.g., consist of) any material and have any shape. For example, the structural component 2 can consist of metal, such as aluminum or steel. For example, such structural components are bodies and/or frames of transport and locomotion means, such as for motor vehicles on water or on land or for aerial vehicles, such as bodies or frames of automobiles, trucks, railroad cars, boats, ships, helicopters, aircraft, and automobiles.

For example, these can be structural components 2 that are surface-treated in their finishing, such as treated in immersion baths, purified, phosphated, or coated such as in purification, phosphating or dipping baths. These surface treatments can, for example, use corrosion protection.

The exemplary reinforced structure 1 comprises a reinforcing part 4 that is arranged in the cavity 3 of the structural component 2 and the reinforcing part 4 can comprise a support part 5 and a connection means 6 that is arranged between the structural component 2 and the support part 5.

As an exemplary connection means 6, in principle any material can be used that is suitable to secure the support part 5 in the cavity 3 of the structural component 2. In addition to the above-mentioned bonding function, the connection means can also take over sealing and reinforcing functions.

Figure 2:
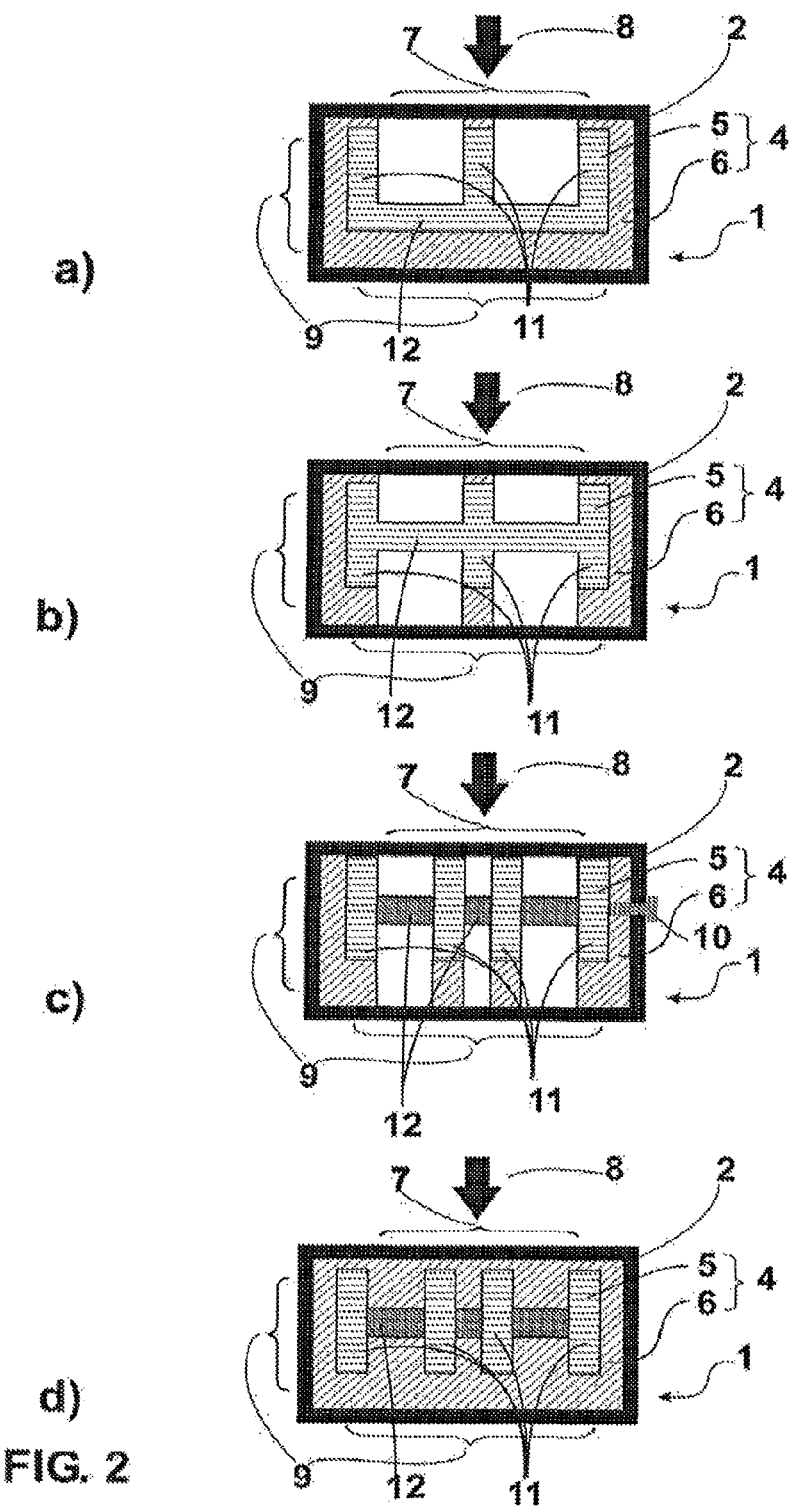
FIGS. 2a-2d show diagrammatic cross-sections through exemplary structures that are reinforced according to the disclosure, with an exemplary reinforcing part according to the disclosure having fins and fin carriers in a cavity of a structural component after activation of a connection.

The connection means 6 can be connected to the entire outside of the support part 5 that faces the structural component 2, as shown in, for example, FIG. 1a or 2d, or only partially as shown in, for example, FIG. 1b, 1c, 2a, 2b or 2c.

The exemplary connection means of the reinforced structure can be activated thermally, by moisture or by electromagnetic radiation, in particular thermally. The use of connection means that can be activated makes it possible to reinforce and/or to seal structural components 2 during their production when the structural components were surface-treated. This is the case, for example, in the production of structures of transport means. After using reinforcing parts 4, but before the activation of the connection means 6, the structural components can be surface-treated, treated for example in purification, phosphating and/or dipping baths, to protect the structural component from corrosion.

Before the activation of the connection means 6, as shown in FIGS. 3a-3d and 4a-4d, an intermediate space 14 can remain between the connection means and the structural component 2 for the circulation of surface treatment agents, such as liquids, during the surface treatment.

The connection means that can be activated can, however, also be applied on the structural component or can be arranged in any other manner between the structural component and the support part.

The connection means 6 of the reinforced structure 1 can, for example, be a foamed material and/or a hardened adhesive composition.

In this case, as foamed material, in principle any foamable material can be used, such as that which can be caused to foam by being activated in a controlled manner. In this case, this material may or even may not have reinforcing properties. The foamable material can be foamed thermally, by moisture, or by electromagnetic radiation.

Such a foamable material can, for example, have a chemical or a physical propellant. Chemical propellants can be organic or inorganic compounds that decompose under the effect of temperature, moisture or electromagnetic radiation, whereby at least one of the decomposition products is a gas. As physical propellants, for example, compounds can be used that pass into the gaseous aggregate state when the temperature is increased. As a result, both chemical and physical propellants are able to produce foam structures in polymers.

The foamable material is, for example, foamed thermally; in doing so, chemical propellants can be used. As exemplary chemical propellants, for example, azodicarbonamides, sulfohydrazides, bicarbonates, or carbonates are suitable.

Suitable exemplary propellants are, for example, also commercially available under the trade name Expancel® from the company Akzo Nobel, The Netherlands, or under the trade name Celogen® from the company Chemtura Corp., USA.

The heat that is involved for the foaming can be introduced by external or by internal heat sources, such as an exothermic chemical reaction. The foamable material is, for example, foamable at an exemplary temperature from 110° C. to 250° C., in particular from 150° C. to 200° C., and preferably, for example, from 160° C. to 180° C.

As foamable materials, for example, single-component epoxide resin systems that do not flow at room temperature, that have for example an elevated impact resistance, and that contain thixotropic agents such as aerosils or nanoclays are suitable. For example, such epoxide resin systems can have 20 to 50% by weight of a liquid epoxide resin, 0 to 30% by weight of a solid epoxide resin, 5 to 30% by weight of resistance modifiers, 1 to 5% by weight of physical or chemical propellants, 10 to 40% by weight of fillers, 1 to 10% by weight of thixotropic agents, and 2 to 10% by weight of heat-activatable hardening agents. In addition to solid epoxide resins, crystalline polyepoxides such as triglycidyl isocyanurates, terephthalic acid diglycidyl ethers, mixtures of terephthalic acid diglycidyl ethers with trimellitic acid triglycidyl ethers, hydroquinone diglycidyl ethers as well as adducts that consist of trimethylolpropane diglycidyl ethers with diisocyanates such as 4,4'-, 2,4'-, and 2,2'-diphenylmethane diisocyanate (MDI), 2,4- and 2,6-toluylene diisocyanate (TDI) or 1-isocyanato-3,3,5-trimethyl-5-isocyanatomethyl-cyclohexane (IPDI) are also suitable.

As resistance modifiers, reactive liquid rubbers based on nitrile rubber or derivaives of polyether-polyol-polyurethanes, core-shell polymers, and similar systems known to one skilled in the art are suitable.

Exemplary foamable materials that are also suitable are propellant-containing single-component polyurethane compositions built up of crystalline polyesters that have OH groups mixed with additional polyols, preferably for example polyether polyols, and polyisocyanates with blocked isocyanate groups. The melting point of the crystallin polyester should, for example, be ≥50° C. The isocyanate groups of the polyisocyanate can be blocked, for example, with nucleophiles such as caprolactam, phenols or benzoxalones. In addition, blocked polyisocyanates are suitable as they are used, for example, in the coating powder technology and are commercially available from Degussa GmbH, Germany, for example, under the trade names Vestagon® BF 1350 and Vestagon® BF 1540. As isocyanates, encapsulsated or surface-deactivated polyisocyanates, which are known to one skilled in the art and are described in, for example, EP 0 204 970, are also mentioned.

In addition, propellant-containing two-component epoxide/polyurethane compositions, as they are described in, for example, WO 2005/080524 A1, whose disclosure is included herewith, are suitable as foamable materials.

Exemplary foamable materials that are also suitable are marketed, for example, under the trade name SikaBaffle® 240, SikaBaffle® 250, or SikaBaffle® 255 by the Sika Corp., USA and are described in the U.S. Pat. No. 5,266,133 and U.S. Pat. No. 5,373,027, whose disclosures are incorporated herein by reference in their entireties.

As foamable materials with reinforcing properties, exemplary preferred materials are those marketed under the trade name SikaReinforcer® 941 by the Sika Corp., USA. The latter are described in U.S. Pat. No. 6,387,470, whose disclosure is incorporated herein by reference in its entirety.

In the foamed state, the foamable material can take over, for example, sealing, bonding and/or reinforcing functions.

Various systems, such as those that can be caused to harden by being activated in a controlled manner, can be used as hardened adhesive compositions. This takes place, for example, thermally, by moisture, electromagnetic radiation, or particle radiation, in particular thermally.

For example, heat-hardening adhesive compositions that harden at a temperature of ≥110° C., in particular from 150° C. to 220° C., and preferably, for example, from 160° C. to 200° C., are suitable as hardening adhesive compositions.

The hardening adhesive composition can be a single-component epoxide resin composition, a single-component polyurethane composition, or a single-component acrylate composition.

Most preferably, the hardening adhesive composition is for example a single-component, heat-hardening epoxide resin composition that comprises at least one epoxide resin A and at least one hardening agent B for epoxide resins, which is activated by elevated temperature.

An exemplary epoxide resin A, which on average has more than one epoxide group per molecule, is preferably a liquid epoxide resin or a solid epoxide resin. The term "solid epoxide resin" is best known to one skilled in epoxides and is used in contrast to "liquid epoxide resin." The glass transition temperature of solid resins is above room temperature (i.e., the resins can be crushed into free-flowing powders at room temperature).

Such solid epoxide resins are commercially available, for example, from The Dow Chemical Company, USA, from Huntsman International LLC, USA, or from Hexion Specialty Chemicals, Inc., USA.

Such liquid resins are commercially available, for example, under the trade names Araldite® GY 250, Araldite® PY 304, Araldite® GY 282 from the company Huntsman International LLC, USA, or D.E.R.® 331 or D.E.R.® 330 from the company The Dow Chemical Company, USA, or under the trade name Epikote® 828 or Epikote® 862 from the company Hexion Specialty Chemicals, Inc., USA.

The hardening agent B for epoxide resins is activated by elevated temperature. In this connection, this is for example a hardening agent that is selected from the group that comprises (e.g., consists of) dicyanodiamide, guanamines, guanadines, aminoguanidines, and derivatives thereof. In addition, accelerating active hardening agents, such as substituted ureas, such as, for example, 3-chloro-4-methyl-phenyl urea (chlorotoluron) or phenyl-dimethyl ureas, in particular p-chlorophenyl-N,N-dimethyl urea (monuron), 3-phenyl-1,1-dimethyl urea (fenuron) or 3,4-dichlorophenyl-N,N-dimethyl urea (diuron), can be used. In addition, compounds from the class of imidazoles and amine complexes can be used.

The hardening adhesive composition, a single-component, heat-hardening polyurethane composition, which is built up from polymeric polyols and polyisocyanates, is also suitable. Suitable polyisocyanates are, for example, di- and triisocyanates.

In addition, the polyurethane composition contains at least one hardening agent B', which contains groups that are reactive to isocyanates and are present in blocked form. In this case, the blocking can have a chemical or physical nature.

In addition, the hardening adhesive composition can be a single-component, heat-hardening acrylate composition. The latter comprises for example at least one divalent or multivalent monomer that contains acryl or methacryl groups as well as at least one monofunctional monomer that contains acryl or methacryl groups.

An exemplary hardening agent B", the acrylate composition contains a thermal initiator in blocked form, which triggers the polymerization of acrylate or methacrylate monomers.

In addition, it can be advantageous that during hardening, the hardening adhesive composition has an expansion of 0 to 5%.

The support part 5 can include any suitable materials. Exemplary preferred materials are plastics, such as polyurethanes, polyamides, polyesters, and polyolefins, preferably high-temperature-resistant polymers such as poly(phenylene ethers), polysulfones, or polyether sulfones; composites, such as polyamides and glass fibers; metals, such as aluminum and steel; or any combinations of these materials.

Figure 3:
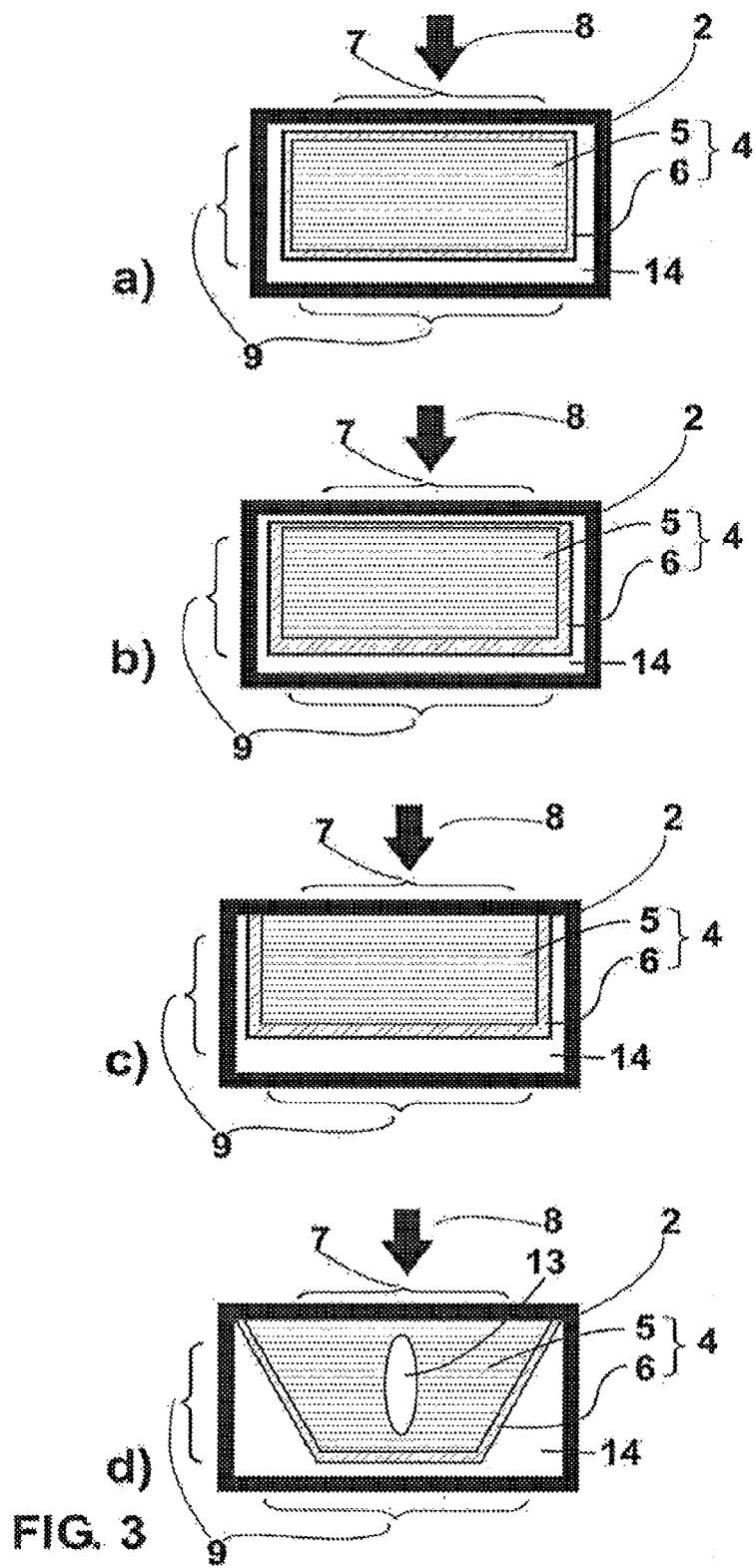
FIGS. 3a-3d show diagrammatic cross-sections through exemplary structures that are reinforced according to the disclosure, with an exemplary reinforcing part according to the disclosure in a cavity of a structural component before activation of a connection.

In addition, the support part 5 can have any design and any structure. For example, it can be solid, as shown in FIGS. 1a, 1b, 3a, 3b and 3c, or hollow, or have through openings 13, as shown in FIGS. 1c and 3d.

As shown in FIGS. 2a-2d and 4a-4d, the support part 5 can have at least one fin 11 and at least one fin carrier 12, such as at least one fin carrier that is arranged essentially perpendicularly to at least one fin.

Support parts 5, which have through openings, and/or fins and fin carriers are advantageous to the extent that surface treatment liquids can circulate better in the structural component 2. In addition, such support parts have a lower weight and can involve less material in their finishing.

In addition, the support part 5 can include (e.g., consist of) a component, as shown, for example, in FIG. 2a, 2b, 4a, or 4b, or of several components that are connected to one another, as shown in FIGS. 2c, 2d, 4c, and 4d.

In addition, the disclosure comprises a reinforcing part 4 for reinforcing cavities 3 of structural components 2 comprising a support part 5 and a connection means 6, which can be activated and is applied to the outside of the support part 5. For example, these are reinforcing parts as well as structural components, as they were previously mentioned as being suitable for the reinforced structure 1.

The reinforcing part 4 can be formed in such a way that after the activation of the connection means 6, the distance between the support part 5 and the structural component 2 at the positions of the structural component with a higher probability of deforming 7 under a force load 8 from the outside on the structural component 2 is shorter than at the positions of the structural component with a lower probability of deforming 9 under a force load 8 from the outside.

The force load 8 from the outside can be a load type in motor vehicle accidents: such as a frontal collision, impact against obstacles, crash-barrier impact, vehicle-vehicle impact, side impact or rear impact. The probability of deforming is determined by using an FE model of the structural component 2.

The amount of the connection means 6 of the support part 5 at the position of the corresponding structural component 2 with the highest probability of deforming is 0-60% (preferably, e.g., 10-30%) of the amount of the connection means 6 at the position of the structural component 2 with the lowest probability of deforming under a force load from the outside.

In addition, it can be advantageous that the amount of the connection means 6 at the positions of the structural component with a higher probability of deforming 7 under a force load from the outside on the structural component is smaller than at the positions of the structural component with a lower probability of deforming 9 under a force load from the outside.

It can also be advantageous that the connection means 6 can be activated thermally, by moisture or by electromagnetic radiation, in particular thermally.

In addition, it can be advantageous that the connection means 6 is a foamable material and/or an adhesive, such as an adhesive that has an expansion of 0-5% in the activation.

It can be advantageous that the support part 5 has at least one fin 11 and at least one fin carrier 12, such as at least one fin carrier that is arranged essentially perpendicularly to at least one fin.

In addition, it can be advantageous that before the connection means 6 is activated, the distance between the reinforcing part 4 and the structural component 2 makes possible the access of liquids, such as surface-treatment liquids, to the surface of the structural component that faces the reinforcing part 4.

Exemplary advantages of the above-mentioned embodiments were previously mentioned.

In addition, the disclosure comprises a method for reinforcing a structural component 2 by placing at least one reinforcing part 4, comprising a support part 5 and a connection part 6 that can be activated and that is arranged between the structural component 2 and the support part 5, in a cavity 3 of the structural component. The method comprises:

i) Setting up an FE model of the structural component 2, without the at least one reinforcing part 4 being arranged in its cavity 3; or i') Setting up an FE model of the structural component 2, in whose cavity 3 the at least one reinforcing part 4 is arranged;

ii) Calculation of the crash behavior of the FE model;

iii) Reduction of the amount (i.e., using a lesser amount) of activatable connection means at positions with high deformation compared to positions with low deformation of the structural component, such as in the cross-section of the structural component, in the calculated crash behavior of the FE model;

iv) Production of the reinforcing part, which has a distribution of the connection means corresponding to the knowledge of the preceding steps;

v) Placing of the reinforcing part in the cavity of the structural component; and vi) Activation of the connection means 6.

For example, the crash behavior of step ii) is a behavior in a standardized load type from the motor vehicle industry, such as a standardized load type in motor vehicle accidents.

For example, these are reinforcing parts 4 as well as structural components 2, as they were previously mentioned as suitable for the reinforced structure 1.

As previously mentioned, FE models can advantageously be used for designing and optimizing the reinforcing parts 4 and the reinforced structures 1. It can be especially advantageous with the method for reinforcing structural components 2 to stipulate minimum requirements (i.e., specifications) and/or maximum requirements imposed on the FE model in the crash behavior, such as, for example, the mass of the reinforcing part or the depth or the speed of the intrusion.

In addition, it can be advantageous if the method in addition includes achieving the minimum requirements and/or maximum requirements imposed on the FE model in the crash behavior.

This could ensure that despite weight-reducing modifications on the FE model, for example in step iii) and/or in a possible step for reducing the weight of the support part 5 by material reduction, the FE model satisfies the desired, specified minimum requirements and/or maximum requirements. Such weight-reducing modifications entail not only an advantage of the weight reduction but rather additionally decrease the material expense.

It can be further advantageous when at least one of features i), i'), ii), iii) and, if present, the reducing of the weight of the support part by material reduction and for achieving a minimum requirement and/or maximum requirements imposed on the FE-model in the crash behavior are run through several times.

The production of the reinforcing parts 4 can be carried out in varied ways. In a possible variant, the production is carried out in an injection-molding process. In this case, for example, a two-component injection-molding method can be used. In this case, for example, first of all a first component, in this case the support part 5, can be sprayed. After solidification of this first component, the cavity in the tool is enlarged or adapted, and the molding that is produced is placed in a new tool, and a second component, in this case the connecting material, is molded onto the first component with a second mold aggregate.

Of course, the producing of the reinforcing part 4 by other types of production will be apparent to those skilled in the art.

Figure 4:
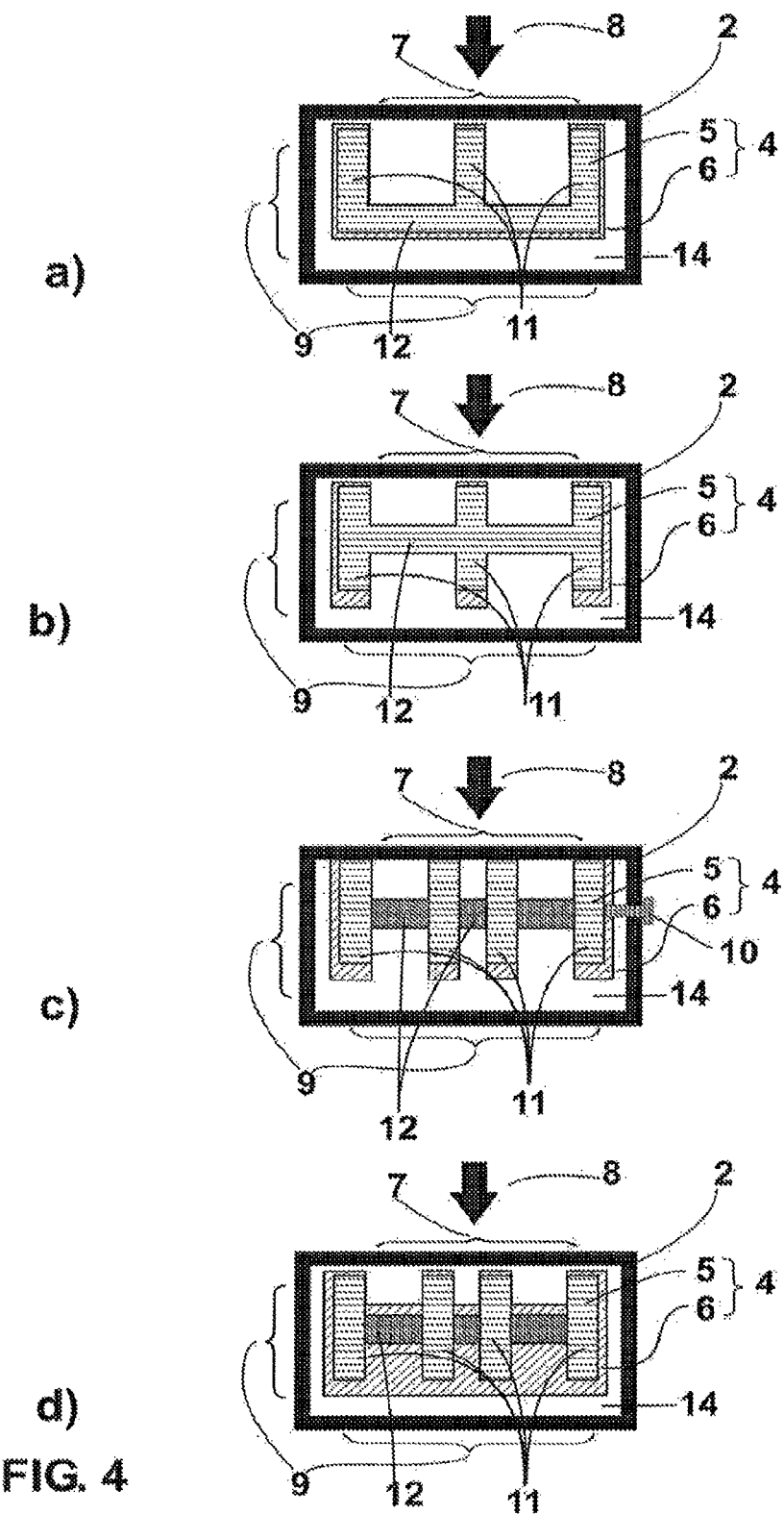
FIGS. 4a-4d show diagrammatic cross-sections through exemplary structures that are reinforced according to the disclosure, with exemplary reinforcing part according to the disclosure with fins and fin carriers in a cavity of a structural component before activation of a connection.

The placing of the reinforcing part 4 in the cavity 3 of the structural component 2 takes place, for example, with a clip 10, as shown, for example, in FIG. 4*c*, which before activation of the connection means 6 can connect the reinforcing part quickly and simply to the structural component, and holds it in place, since the amount of time saved and the simplicity of assembly steps in industrial manufacturing can be of great economic value. For example, the clip 10 is part of the reinforcing part. In addition, the clip can be advantageously of sufficient strength to hold the reinforcing part in place despite flow stresses by liquids, for example during purification, phosphating or dipping baths. The clip can include (e.g., consist of) any materials. Exemplary preferred materials, however, are any materials that were previously named as exemplary preferred materials for the support part 5.

The placing of the reinforcement part 4 in the cavity 3 of the structural component 2 can also be carried out, however, in any other suitable manner, such as by simple fastening of the reinforcing part in the cavity of the structural component.

The activation of the connection means 6 was previously mentioned.

Of course, the disclosure is not limited to the embodiments that are shown and described.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Reinforced Structure
2 Structural Component
3 Cavity
4 Reinforcing Part
5 Support Part
6 Connection Means
7 Higher Probability of Deforming
8 Force Load
9 Lower Probability of Deforming
10 Clip
11 Fin
12 Fin Carrier
13 Through Opening
14 Intermediate Space

What is claimed is:

1. A reinforced structure comprising:
   a structural component; and
   a reinforcing part that is arranged in a cavity of the structural component, the reinforcing part comprising:
      a support part; and
      a connection part for activation and for application to an outside of the support part, wherein the support part is molded such that after inserting the support part and connection part into the cavity and activation of the connection part, a distance between the support part and the structural component at positions of the structural component for receiving a force load from the outside on the structural component is shorter than at positions of the structural component with a lower probability of deforming under a force load from the outside,
      wherein a portion of the connection part is present between the support part and the structural component at positions of the structural component for receiving a force load from the outside,
      wherein the support part is not in contact with the structural component,
      wherein before activation of the connection part, a distance between the connection part and the structural component at the position of the structural component for receiving a force load from the outside exists for access of a liquid to a surface of the structural component that faces the reinforcing part.

2. The reinforced structure according to claim 1, wherein the connection part is activated thermally, by moisture or by electromagnetic radiation.

3. The reinforced structure according to claim 1, wherein the connection part is a foamable material and/or an adhesive.

4. The reinforced structure according to claim 1, wherein the support part has at least one fin and at least one fin carrier.

5. A reinforced structure comprising:
   a structural component; and
   a reinforcing part that is arranged in a cavity of the structural component, the reinforcing part comprising:
      a support part; and
      a connection part for activation and for application to an outside of the support part, wherein the support part is molded such that after inserting the support part and connection part into the cavity and activation of the connection part, a distance between the support part and the structural component at positions of the structural component for receiving a force load from the outside on the structural component is shorter than at positions of the structural component with a lower probability of deforming under a force load from the outside,
   wherein a portion of the connection part is present between the support part and the structural component at positions of the structural component for receiving a force load from the outside,
   wherein the support part is not in contact with the structural component,
   wherein before activation of the connection part, a distance between the connection part and the structural component exists for access of a liquid to a surface of the structural component that faces the reinforcing part,
   wherein the support part consists of only one component,
   wherein before activation of the connection part, a distance between the connection part and the structural component at the position of the structural component for receiving a force load from the outside exists for access of a liquid to a surface of the structural component that faces the reinforcing part.

6. The reinforced structure according to claim 1, wherein the connection part expands upon activation.

7. The reinforced structure according to claim 1, wherein the connection part includes a single-component, heat-hardening epoxide resin composition that comprises at least one epoxide resin A and at least one hardening agent B for an epoxide resin.

* * * * *